United States Patent [19]
Manning

[11] Patent Number: 5,898,495
[45] Date of Patent: Apr. 27, 1999

[54] TILT-COMPENSATED INTERFEROMETER

[76] Inventor: Christopher J. Manning, 502 S. Blaine St., Moscow, Id. 83840

[21] Appl. No.: 08/959,030

[22] Filed: Oct. 28, 1997

Related U.S. Application Data

[60] Provisional application No. 60/029,364, Oct. 28, 1996, provisional application No. 60/034,996, Jan. 7, 1997, and provisional application No. 60/052,488, Jul. 14, 1997.

[51] Int. Cl.$^6$ ..................................................... G01B 9/02
[52] U.S. Cl. ................ 356/346; 250/339.07; 250/339.08
[58] Field of Search ...................... 356/346; 250/339.07, 250/339.08

[56] References Cited

U.S. PATENT DOCUMENTS

| | | |
|---|---|---|
| 4,179,219 | 12/1979 | Smith . |
| 4,383,762 | 5/1983 | Burkert . |
| 4,654,530 | 3/1987 | Dybwad . |
| 4,881,815 | 11/1989 | Sommargren . |
| 4,915,502 | 4/1990 | Brierley . |
| 5,108,184 | 4/1992 | Brown et al. . |
| 5,148,235 | 9/1992 | Tank et al. . |
| 5,191,391 | 3/1993 | Tsai . |
| 5,309,217 | 5/1994 | Simon et al. . |
| 5,341,207 | 8/1994 | Tank et al. . |
| 5,400,143 | 3/1995 | Bauer . |
| 5,457,529 | 10/1995 | Tank et al. . |
| 5,471,304 | 11/1995 | Wang . |

OTHER PUBLICATIONS

P.R. Griffiths and J. A. de Haseth, *Fourier Transform Infrared Spectrometry*, pp. 145 and 164 (New York: John Wiley and Sons, 1986).

W. H. Steel, Aspen Int. Conf. On Fourier Spectroscopy, 1970, *Interferometers for Fourier Spectroscopy*, (G. A. Vanasse, A. T. Stair, and D.J. Baker, eds.) AFCRL–71–0019, pp. 43–53 (1971).

J. Kauppinen, I. K. Salomaa, and J. O. Partanen, *Carousel Interferometer*, Applied Optics, vol. 34, No. 27, pp. 6081–6085 (Sep. 20, 1995).

A. S. Zachor, *Drive nonlinearities: their effects in Fourier spectroscopy*, Applied Optics, vol. 16, No. 5, pp. 1412–1424 (May 1977).

Excerpt, S. T. Smith and D. L. Decker, *Spiralling Toroidal Spectrometer*, Proc. IRIS vol. 30, No. 2, p. 133 (1985).

A. S. Zachor and S. M. Aaronson, *Delay compensation: its effect in reducing sampling errors in Fourier spectroscopy*, Applied Optics, vol. 18, No. 1, pp. 68–75 (Jan. 1, 1979).

M. Bottema and H. J. Bolle, *An Interferometer with Spherical Mirrors for Fourier Spectroscopy*, in the Aspen Int. Conf. on Fourier Spectroscopy, pp. 211–214.

*Primary Examiner*—Robert Kim
*Assistant Examiner*—Andrew H. Lee
*Attorney, Agent, or Firm*—Antton & Associates P.C.

[57] ABSTRACT

A novel variation of Michelson's interferometer uses tilt- and shear-compensation optics to allow various mirror motions to produce variation of path difference. The tilt-compensation mechanism consists of two complementary reflections from a single plane mirror to produce a beam having a constant angle of propagation, typically the same as the input beam. Using a retroreflector to invert the image of the single plane mirror before the second reflection produces the complementary reflections. A particularly efficient embodiment of the present invention uses a balanced disk-shaped mirror to effect very rapid variation of path difference by nutation or precession. Other advantages of tilt-compensation include photometric stability. This interferometer has applications in spectrometry, spectral imaging and metrology.

14 Claims, 13 Drawing Sheets

PLOT OF DISK RADIUS VS. ANGLE.

$$F(\Theta) = 4\pi^2 p f^2 \int_0^r r^2(t + 2r\cos\Theta\sin\phi) \, dr \, d\Theta$$

PLOT OF DISTORTION OF DISK SURFACE
SHOWING FIT TO SPHERICAL FUNCTION.

(TOP VIEW)

(EDGE VIEW)

EDGE VIEW

TILT-COMPENSATED INTERFEROMETER

RELATED APPLICATIONS

This application claims the benefit of Provisional Applications Ser. Nos. 60/029,364, filed Oct. 28, 1996, 60/034, 996, filed Jan. 7, 1997, and 60/054,786 filed Jul. 14, 1997.

BACKGROUND AND SUMMARY OF THE INVENTION

Two important applications of interferometers are metrology and spectrometry. Spectrometry includes many types of measurements of wavelength and amplitude, as well as spectral imaging. One important commercial application of interferometers is spectroscopic measurements in the infrared spectral region. Fourier transform infrared (FT-IR) spectrometers are versatile and powerful tools for measuring infrared spectra. They have dominated the marketplace and the experimental literature of vibrational spectroscopy for almost three decades. Their success results largely from the well-known multiplex, throughput and registration advantages of interferometric spectrometry. Many aspects of the art of interferometry have been compiled. See, for example, P. R. Griffiths and J. A. de Haseth, Fourier Transform Infrared Spectrometry, (New York: John Wiley and sons, 1986).

In the usual rapid-scan mode of operation of FT-IR spectrometers, a collimated beam of radiation is intensity modulated by scanning one of the interferometer mirrors to produce a constant optical velocity on the order of 0.06 to 6 cm/s. The resulting modulated radiation intensity (an interferogram), possibly modified by interaction with a sample, is recorded from the output by an infrared detector. If a system under study varies with time, the time-scale of the spectral changes determines whether or not conventional rapid-scan FT-IR spectrometry may be used for the measurement. Typical FT-IR spectrometers require between 40 ms and 1 s to sweep an interferogram to 4-cm$^{-1}$ resolution. If the spectral information varies with frequency components lower than the scan rate, the time-scale of the spectral variations is longer than the time-scale of the spectral measurement, i.e., the system is varying slowly with time. Under these conditions, the conventional rapid-scan mode of operation of FT-IR spectrometers may be conveniently used to generate a time-resolved sequence of spectra (interferograms). By increasing the scan rate of the interferometer mirror, the time required for spectral measurement can be shortened to increase the range of application.

One of the fundamental limitations, however, of conventional FT-IR instruments is the rate at which a spectrum (i.e., interferogram) can be scanned. For all commercial FT-IR instruments, the limitation arises principally from the linear motor used to drive interferometer scanning, together with the mass of the moving mirror assembly. The shortest possible scan time in most systems operating at 4-cm$^{-1}$ resolution is approximately 40 ms. Under these conditions, the time required to turn around the mirror is comparable to the data acquisition time, i.e., the duty cycle efficiency is low, and drops further if the scan rate is increased.

Limited scan rates have been tolerated for so long for a number of reasons. As noted above, in conventional instruments the interferometer mirror is translated by a voice coil drive. The mirror sweep encodes the radiation intensity so that all wavelengths can be measured simultaneously (the Fellgett advantage). A Fourier transform is then necessary to decode the interferogram and recover the spectrum. In step-scan operation the time-dependence of the encoding is essentially removed by stopping the mirror, thus simplifying a variety of time-resolved spectroscopic measurements. The step-scan and stroboscopic approaches are applicable only to processes that can be repeated many times. These approaches are not suitable for real-time measurements.

An alternate approach uses very-rapid-scan operation in which the mirror is moved very quickly, so that a system under study remains in a nearly constant state for the duration of one scan. This approach has the added benefits of producing data in real time and avoiding susceptibility to low-frequency noise sources that adversely affect step-scan and stroboscopic FT-IR measurements.

The force developed by a voice coil mirror drive is the product of the magnetic field strength, the length of the winding, and the current in the winding. For a conventional FT-IR system the maximum force that can be developed is on the order of 1 or 2 N. The mass of the moving mirror and the moving portion of the bearing can be taken to be 30 g, but in some systems these have a mass greater than 500 g. A typical FT-IR system is barely capable of driving the mirror through a distance suitable for phase modulation at 1 kHz. This distance is only a few fringes of the reference laser, much less than the 4000 fringe sweep required for 4-cm$^{-1}$ resolution. Individual systems may vary in mass, voltage and other details of their designs, but such differences do not matter much. At low frequencies, voice coil response drops as $1/f^2$ for purely mechanical reasons. At higher frequencies, the coil inductance becomes significant and the response drops as $1/f^3$. The acceleration that is required for measuring a 4-cm$^{-1}$ spectrum in 1 ms can be readily derived and is about 12,500 m/s$^2$. To achieve this acceleration a force of about 375 N must be applied to a 30 g mirror, with a resulting optical velocity of 250 cm/s. It might be possible to gain a factor of 100 in voltage (with a substantial high-voltage power supply and amplifier), and a factor of 10 in magnetic field strength, but there are fewer, if any, mirror/bearing assemblies that would withstand forces of this magnitude. Even if such an assembly could be constructed, the reaction force would tend to cause unacceptable disturbances to other optical components.

Moving a mirror with the velocities and accelerations suggested above would permit a very-rapid-scan operation to combine many of the advantages of conventional FT-IR with the advantages of step-scan operation. Such a system would have application to both repeatable and non-repeatable events on the millisecond time-scale. This approach would fail for transients which are too fast, and is generally not suitable for photoacoustic or photothermal measurements which are dependent on the modulation (Fourier) frequencies of the spectral multiplexing. The modulation frequencies produced are proportional to the velocity of mirror travel. An optical retardation velocity appropriate for use with a pyroelectric detector is about 0.3 cm/s, corresponding to a modulation frequency of 5 kHz for reference laser radiation at 15,804 cm$^{-1}$. At this speed a single 4-cm$^{-1}$ scan requires 840 ms. For a mercury-cadmium-telluride (MCT) detector, a much higher optical velocity, typically 6 cm/s, produces better results. The reference laser is then modulated at 100 kHz, but the scan is still 42 ms. If a 4-cm$^{-1}$ interferogram is scanned at constant velocity in 1 ms, the optical velocity will be about 250 cm/s and the laser will be modulated at 4 MHz. This is 1000 times higher scan rate than is appropriate for a TGS detector, and a million times higher than is commonly used in step-scan measurements. The Fourier frequencies for the mid-infrared will be in the range from 100 kHz to 1 MHz under these conditions. As the mirror velocity changes, the dynamic range of the interferogram also changes. The amplitude of the optical interference signal remains constant, independent of scan velocity. If the detector response is flat to the highest frequency present, then the electronic interferogram amplitude is also independent of scan speed. More of the detector noise is passed as the detector bandwidth is opened to accommodate a broader range of modulation frequencies. The net result is that the SNR per scan goes down as the square root of the scan time, while the SNR per measurement time remains constant. Analog-to-digital converters that can sample with sufficient resolution to allow interferogram recording out to 100 MHz (were it possible to scan a mirror that rapidly) have been available for some time.

A rotary motion can be a better approach to generating rapid path difference variation. There is, however, an apparent symmetry mismatch between rotating optical elements and the nominally planar wavefronts in a Michelson interferometer. To reach a speed of 1 ms per scan, the rotating element will probably have to spin at 30,000 rpm. Under a stress of up to 50,000 g's they would have to be flat to approximately 250 nm, a tenth-wave of 2.5 $\mu$m radiation. In spite of the apparent symmetry mismatch, numerous rotating interferometer designs have been proposed and demonstrated. Each of these designs exhibits some tradeoffs. Dybwad's design, disclosed in U.S. Pat. No. 4,654,530, uses a rotating prism to vary optical path difference. It has the advantages of simplicity, compactness, and generation of 4 scans per revolution. Disadvantages include a duty cycle well below 100% because of the limited range of angle that produces useful modulation, and dispersion in the prism which distorts the wave number axis. There may be cause for concern about the mechanical strength of suitable IR-transparent prism materials spinning at high speeds. The airflow around the flat surfaces may cause unacceptable drag and turbulence if the system is not evacuated.

Another approach to the symmetry problem is to use optical components of circular or spherical symmetry. M. Bottema and H. J. Bolle, in the Aspen Int. Conf. on Fourier Spectroscopy, have described a confocal interferometer design. 1970 (G. A. Vanasse, A. T. Stair, and D. J. Baker, eds.), AFCRL-71-0019, p. 293 (1971). This design permits only a minute range of retardation. The wave fronts approaching the detector are converging such that the foci from the two arms of the interferometer will only match sufficiently well to produce useful interference for a very limited range of retardation. However, the spherical symmetry of the reflectors allows a large divergence angle in the input beam. Such spherical symmetry might allow the reflector to be a portion of a toroid that is rotated about its center. A confocal design described in U.S. Pat. No. 4,179,219, by Smith, allows for a much larger range of retardation. The convergence rate of the wave fronts is compensated by a varying focal length in the rotating reflector. This design has a more compact size and a larger acceptance angle. It is, however, quite difficult to fabricate a mirror of the required figure. A second drawback of this design is that the mirror figure is a compromise between compensating the focal length for path variation and the slope of the surface required for varying the path difference.

Another approach to generating path difference by rotating optical elements is the use of spinning cube-corner retroreflectors mounted off axis such that the shear varies with rotation angle. Each shear distance produces a unique path difference. Any beam impinging on the reflector will be reflected antiparallel to the incident beam regardless of the rotation angle or shear offset. A series of designs are disclosed by Tank, et al. One appears in U.S. Pat. No. 5,341,207. A variety of related configurations have been published, including the one in U.S. Pat. No. 5,148,235. Some of these designs utilize multiple spinning retroreflectors to increase the rate of change and maximum excursion of path difference. The advantages of these designs include intrinsic tilt- and shear-compensation. Problems with this approach include the fact that off-axis spinning of retroreflectors is inherently unbalanced, and above about 6000 rpm distortion of the retroreflectors becomes significant. Furthermore, large retroreflectors are fairly expensive.

The literature holds deeper insight. Kauppinen's paper, [J. Kauppinen, I. K. Salomaa, and J. O. Partanen, Applied Optics vol. 34, p. 6081 (1995)], discusses a series of related interferometers using the same approach to solve the symmetry problem: complementary reflections from two separate flat mirrors in each arm of the interferometer insure that a final reflection from a plane mirror is at normal incidence. This sends the beam exactly back to the beamsplitter via the inverse of its original path. Perkin-Elmer's Dynascan design is a variant of this general approach. Kauppinen's paper was particularly valuable because it showed enough variations on this theme to allow the common features to be extracted. It also clearly showed that exotic surfaces are not required to solve the symmetry problem, i.e., convert rotation to planar retardation. Kauppinen has proposed and demonstrated a variant which also uses planar reflectors with rotational motion. It is optically equivalent to both Perkin-Elmer's and Brierley's designs (vide infra), but with the advantage that it is particularly compact and resistant to deformation by mechanical and thermal stresses. None of these designs are intended for complete rotation.

Another variation on this theme is Brierley's U.S. Pat. No. 4,915,502. Brierley's design uses two parallel plane mirrors on a rotating platform. Although Brierley specifically excluded the case of complete rotation in his patent claims, the duty cycle for measuring 4-cm$^{-1}$ interferograms using complete rotation of his apparatus is estimated to be 6%. Further, such a design would be difficult to balance for spinning, suffer serious distortion and have to be evacuated because the large flat surfaces would impede rotation in air.

In Brierley, the axis of rotation is a line coming straight out of the drawing. In FIG. 6 of Tank's disclosure in U.S. Pat. No. 5,457,529, the rotation axis is a vertical line in the plane of the paper. As a consequence, the maximum retardation is set by the tilt of the reflector assembly when it is fixed to the rotating shaft. Again, two separate reflectors are used to make the complementary reflections. The problem with this general design by Tank is that alignment between two fairly large spinning mirrors must be maintained to 0.5 arcseconds. The retardation and optical velocity vary sinusoidally with rotation angle. The resulting variations in the modulation frequencies are not a problem if the delays in the infrared and laser channels are matched [A. S. Zachor, Applied Optics vol. 16, p. 1412 (1977), A. S. Zachor and S. M. Aaaronson, Aplied Optics vol. 18, p. 1345 (1977)]. Another approach is disclosed in FIG. 3 of U.S. Pat. No. 5,457,529. This design also uses two separate reflecting surfaces but transforms the problem of aligning two separate rotating reflectors into a problem of polishing two sides of the same parallel disk. However, this design has the disadvantage of adding folding mirrors. It may be easier to adjust the alignment of several static mirrors than the alignment of even one spinning mirror. Tank places an aperture in the center of the disk that makes it more difficult to mount and spin the disk. However, in compensation, Tank has a considerable advantage over a solid disk design which uses both sides of the disk. Because the beam can pass through the center of the disk, the path length is greatly reduced, and consequently a larger beam divergence can be tolerated.

One disadvantage of using the tilted disk of Tank to precess or nutate two parallel surfaces is that the tilt produces a strong bending moment in a centrifugal field. Finite element modeling of a beryllium disk of 1.25-cm thickness and 10-cm diameter tilted 1 degree relative to the shaft results in a deflection of approximately 600 nm. For an aluminum disk of equal dimension, the deflection would be about 6 times greater or nearly 3600 nm. It is desirable to maintain flatness to better than 250 nm for mid-infrared interferometry.

Several types of tilt-compensation optics are known. The most common approach in commercial interferometers is the use of feedback control to provide active tilt-compensation. The tilt of a fixed plane mirror is varied to compensate for tilt of a moving plane mirror. Nicolet and Digilab currently practice this method. A second commercial approach is the use of cube-corner retroreflectors. The simplest use of a cube-corner retroreflector provides tilt- but not shear-compensation. Mattson, Bomem and Oriel currently manufacture interferometers that incorporate cube-corner retroreflectors. Passive tilt compensation has also appeared numerous times in the prior art. Steel's design [W. H. Steel, Aspen Int. Conf. On Fourier Spectroscopy, 1970 (G. A. Vanasse, A. T. Stair, and D. J. Baker, eds.), AFCRL-71-0019, p. 43 (1971)] also uses a cube-corner retroreflector. Another well-known general method is the use of cat's eye retroreflectors. Perhaps because of expense, cat's eye retroreflectors have appeared only in instruments intended for high-resolution measurements. Tilt compensation is important because tilt compromises photometric accuracy and modulation efficiency, particularly when large path differences or short wavelengths such as the near-infrared, visible or ultraviolet spectral range are used.

It is an objective of the present invention to tilt- and shear-compensate an interferometer. It is also an objective of the present invention to allow rapid variation of the path difference of an interferometer. It is also an objective of the present invention to measure multiple spectra rapidly, especially in a Fourier Transform-Infrared (FT-IR) spectrometer. It is also an objective of the present invention to measure one or more spectra rapidly with relatively high resolution. It is also an objective of the present invention to measure complete spectra faster than possible with most present spectrometers and especially FT-IR spectrometers.

The present invention contemplates a spectrometer having a source of a beam of radiant energy, a beamsplitter for dividing the beam of radiant energy into at least first and second energy beams, a first return mirror for reflecting the first beam of radiant energy back to the beamsplitter. A moving mirror receives the second energy beam from the beamsplitter and is capable of moving with some projection along the path of the second energy beam. The moving mirror has a planar optical surface that reflects the second energy beam. A retroreflector receives the second energy beam from the moving mirror and produces a reflection that is complementary at least in part of the second energy beam. A second return mirror returns the second beam of energy to the beamsplitter along a path that is antiparallel to at least a part of the path taken by the second energy beam from the beamsplitter. The second return mirror reflects the second beam of energy to the retroreflector, to the planar optical surface of the moving mirror and to the beamsplitter. The beamsplitter combines at least a part of each of the first and second energy beams to form a combined beam so as to facilitate transmitting the combined beam to a detector of the spectrometer.

The spectrometer of the present invention can use a retroreflector made from a cube-corner reflector, a lateral-transfer retroreflector, a roof reflector, or any other equivalent reflecting means. It is preferred that the retroreflector inverts the energy beam from the moving mirror. Path length variation can be achieved by rotating the moving mirror about an axis of rotation, by pivoting the mirror about a pivoting axis, by sliding the mirror, by translating the mirror, or by any equivalent means for displacing the mirror to create the path length variation needed for the interferometic effect needed for obtaining spectroscopic or metrologic measurements.

It is a feature of the present invention that the path length of an interferometer can change fast by moving a single mirror through any combination of tilting, rotating, oscillating, precessing, nutating or translating motions without disturbing the optical alignment of the spectrometer. The mirrors that control the optical alignment of the interferometer remain fixed. The moving mirror of the present invention has the ability to move fast without disturbing the accuracy of its interferometric effect. The present invention can measure spectra rapidly. Thus, the present invention provides an elegantly simple and economical way to spectroscopically analyze ephemeral, transient phenomena—even ones that before have been difficult, or even impossible, to measure economically.

One feature of the present invention is that the moving mirror can be a relatively simple, flat mirror. If moved by rotation, structural dynamics favor having the moving mirror in the shape of a disk-shaped, approximately flat, planar mirror. In this way the moving mirror can be made lighter and more resistant to deformation under the acceleration of motion. Further, fabrication and mounting of the moving mirror can be simplified by requiring optical access to only one side of the moving mirror. The two sides of the moving mirror need not be parallel, and only one side requires an optical finish. Moreover, the side of the moving mirror that does not have an optical finish can be contoured to better enable the moving mirror to withstand the dynamic stresses induced by rapid motion.

One of the preferred embodiments of the present invention uses complementary reflections from a single plane mirror to cancel angular variation, caused by tilt, of a beam reflecting from that surface. This feature enables the present invention to achieve rapid scan rates in a mechanically simple and economical spectrometer.

All of these objectives, features and advantages of the present invention, and more, are illustrated below in the drawings and detailed description that follows.

DETAILED DESCRIPTION

Figure 1:
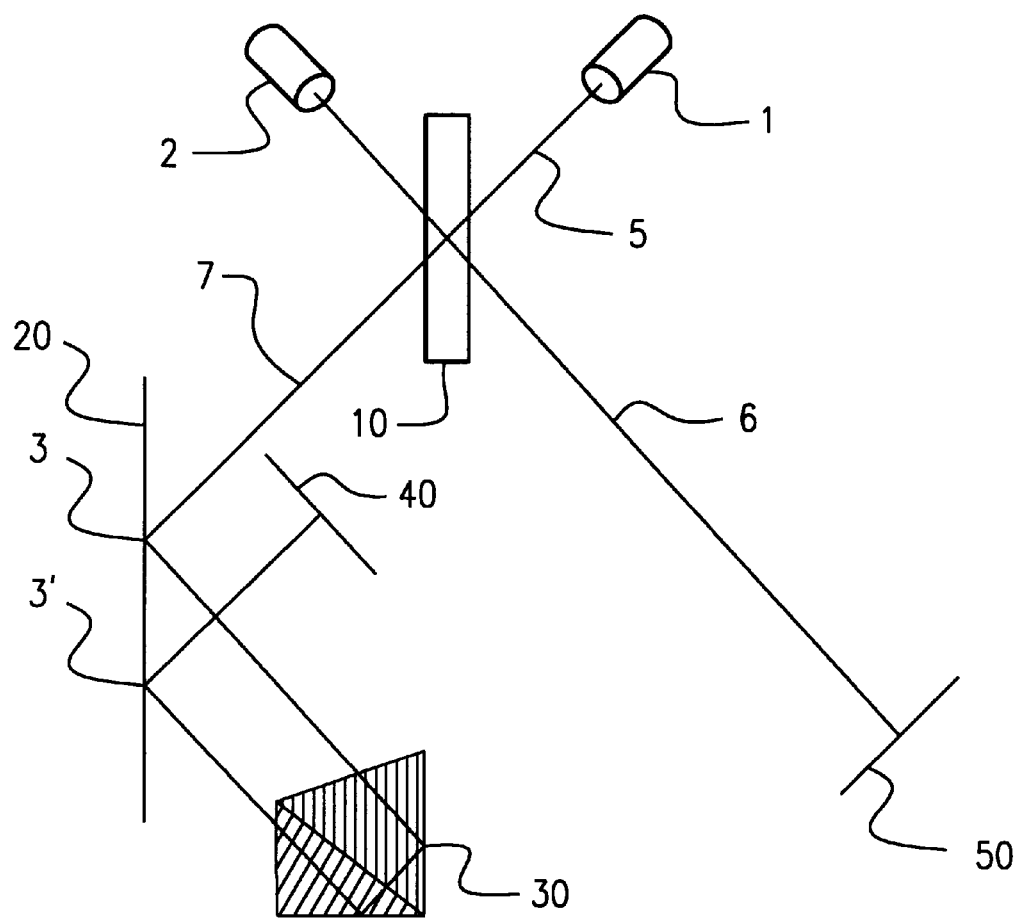
FIG. 1 is a diagram of an interferometer incorporating a tilt-compensation mechanism comprised of a cube-corner retroreflector to produce complementary reflections from a single plane mirror.

With reference to FIG. 1, a collimated primary beam of radiant energy 5 from source 1 propagates to a beamsplitter 10 where it is divided into two beams 6 and 7 which propagate separately to return mirrors 40 and 50, respectively. The source can be any source of polychromatic or monochromatic radiant energy useful in obtaining any measurement, be it analytic, spectroscopic, metrological, etc. The differences between a spectrometer and its interferometer component are not considered material to the invention disclosed herein. As shown in FIG. 1, the return mirrors 40 and 50 are flat. The energy beam 7 propagating to the return mirror 40 does so via two reflections, 3 and 3', at moving mirror 20 and a reflection from cube-corner retroreflector 30. A cube-corner retroreflector is a device formed from three plane mirrors joined at three mutually perpendicular 90 degree angles. Suitable cube-corner retroreflectors are known in the art. The term cube-corner retroreflector as described herein are hollow, or fabricated from material that is transparent to the radiation of interest. The effect of the cube-corner retroreflector 30 is to invert the image of the moving mirror 20 such that the second reflection 3' is complementary with first reflection 3 at mirror 20. Thus, complementary reflections are produced using only a single surface of the mirror 20.

Upon return to moving mirror 20 from the retroreflector 30 the beam 7 is offset sufficiently to clear the original incident beam on the moving mirror 20. The energy beam 7 may reach, for example, a flat return mirror 40 oriented perpendicular to the direction of propagation after a second reflection from the moving mirror 20.

The energy beam 7 arriving at the return mirror 40 is exactly antiparallel to the energy beam propagating from beamsplitter 10 towards mirror 20. Hence, energy beam 7 possesses a constant angle of propagation that is the result of complementary reflections. The constant angle of propagation allows a flat return mirror 40 to return the energy beam 7 exactly on itself to follow a return path to beamsplitter 10 via the inverse of the original path from beamsplitter 10. The two beams returning to the beamsplitter 10 from the return mirrors 40 and 50 are recombined at the beamsplitter 10 and pass on to the detector 2.

The path length of the energy beam 6 from beamsplitter 10 to return mirror 50 is not equal to the path length of the energy beam 6 from beamsplitter 10 to return mirror 40. This path difference leads to a phase difference between the returning beams. These path and phase differences are well known in the art and have useful applications. Here, moving the mirror 20 may vary the path difference between these two paths without having any effect on the optical alignment of the spectrometer.

It will be appreciated by those skilled in the art that the tilt-compensation afforded by the complementary reflections at moving mirror 20 allows many different types of motions to be applied to the moving mirror 20 to produce a difference in path length. For example, the moving mirror 20 may be precessed or nutated, tilted, rotated or translated with or without tilting using known means or any other means that produces an equivalent path length variation. This feature is particularly advantageous in that it provides a way to make spectroscopic measurements in a short period of time (short scan time).

Figure 13:
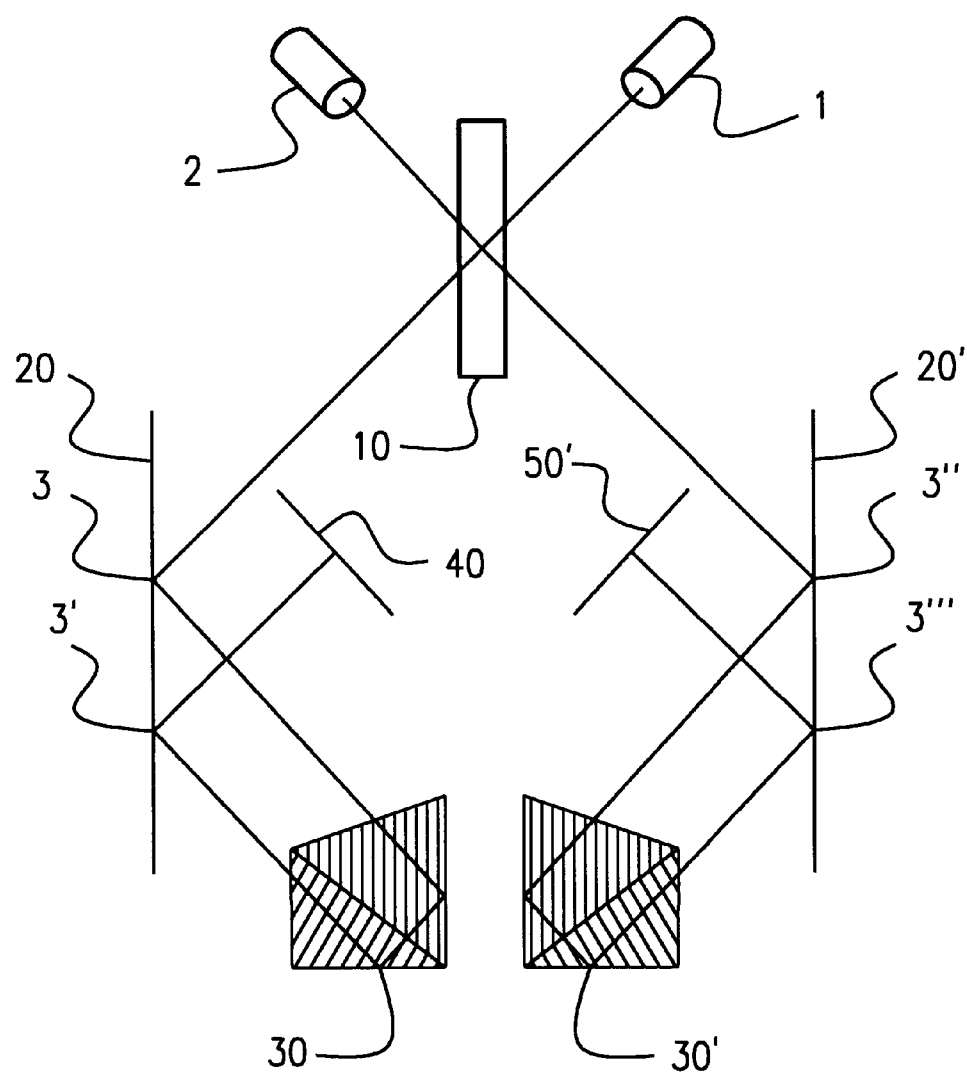
FIG. 13 shows another embodiment of the present invention that uses moving mirrors in both arms of the interferometer of the spectrometer.

The return mirror 50 forming the fixed arm may be replaced by mirrors identical to moving mirror 20 and return mirror 40, together with a cube-corner retroreflector identical to the retroreflector 30 to produce an interferometer having two variable arms. Such a spectrometer is shown in FIG. 13, from which it is apparent that simultaneously moving mirrors 20, 20' serves to simultaneously change the respective path lengths of the first and second energy beams 6, 7, respectively. Furthermore, operating moving mirrors 20 and 20' with opposite phase in each arm of the interferometer doubles the total path difference of the interferometer as well as the rate of change of the path difference. Hence, the embodiment of the invention shown in FIG. 13 can enable a spectrometer to make more rapid scans. Analogous modifications may be practiced with any of the different embodiments of the interferometer disclosed herein.

Figure 2:
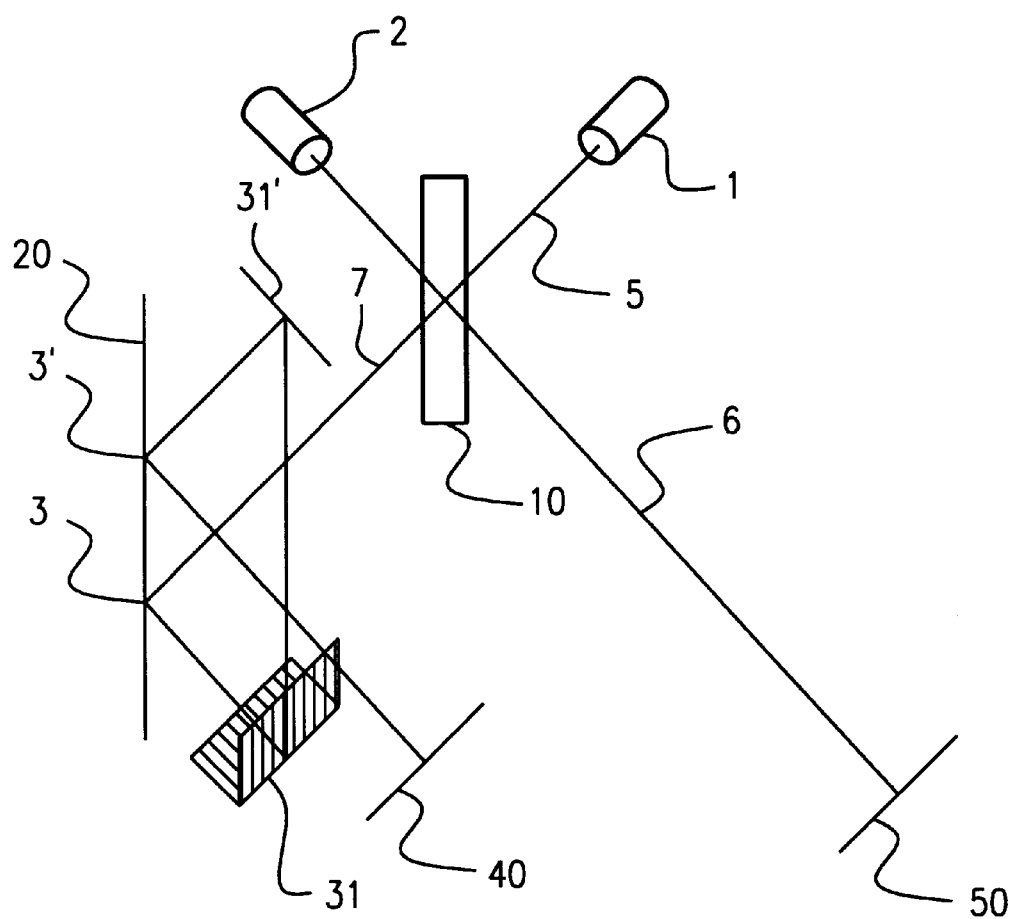
FIG. 2 is a diagram of a variation of an interferometer incorporating a tilt-compensation mechanism that uses a lateral transfer retroreflector to produce complementary reflections from a single plane mirror.

FIG. 2 shows another embodiment of the present invention. A primary beam of radiant energy 5 from the source 1 propagates to the beamsplitter 10 where it is divided into energy beams 6 and 7 as before. The difference between FIG. 1 and FIG. 2 is that the cube-corner retroreflector 30 has been replaced with a lateral-transfer retroreflector 31 and 31'. A lateral-transfer retroreflector is a cube-corner retroreflector which has one mirror facet 31' displaced with preservation of the perpendicular angles. A lateral-transfer retroreflector can also be viewed as the combination of a roof retroreflector 31 and a plane mirror 31'. A roof retroreflector, as is known in the art, is two plane mirrors joined at a 90 degree angle to produce retroreflection of rays lying in the plane perpendicular to both mirror faces. All other components retain the functions described relative to FIG. 1. This embodiment is optically equivalent to FIG. 1 and is an equivalent structure.

Figure 3:
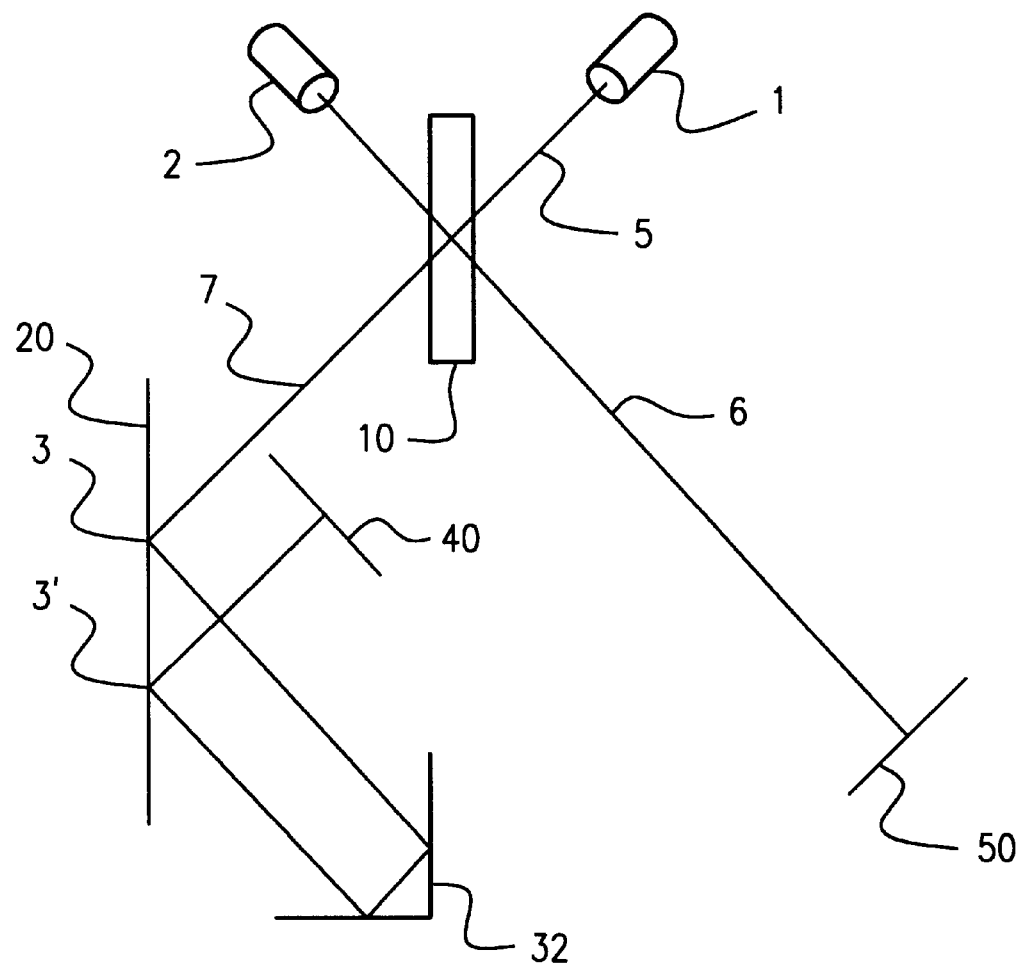
FIG. 3 is a diagram of a variation of an interferometer incorporating a tilt-compensation mechanism that may be used in cases where the tilt is constrained to one plane.

FIG. 3 shows another embodiment of the present invention. A collimated primary beam of energy 5 from the source 1 propagates to the beamsplitter 10 where it is divided as before. However, the cube-corner retroreflector 30 in FIG. 1 has been replaced by a roof retroreflector 32, which does not fully invert the image of the mirror 20. As a consequence, only partial compensation of tilting is afforded by the complementary reflections at mirror 20. All other components retain the functions described previously in connection with FIG. 1. In cases where tilting of the moving mirror 20 can be constrained to a plane (in this case, a tilt arc lying in the plane of the drawing), this embodiment may be more economical than the embodiments disclosed in FIGS. 1 and 2.

Figure 4:
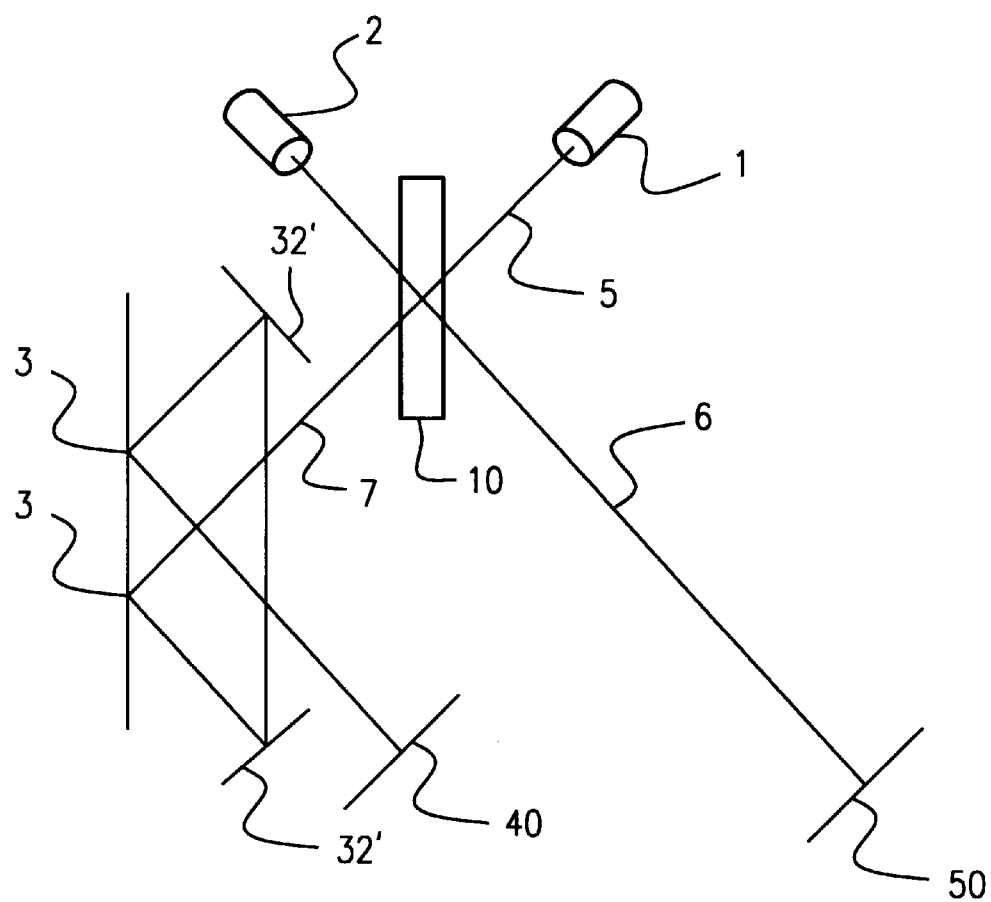
FIG. 4 is a diagram of a variation of an interferometer incorporating a tilt-compensation mechanism that may be used in cases where tilt is constrained to one plane.

FIG. 4 shows another embodiment of the present invention. The primary beam of energy 5 from the source 1 propagates to the beamsplitter 10 where it is divided into energy beams 6 and 7 as discussed before. However, the roof retroreflector 32 has been divided into two reflecting elements 32' that are physically separated as shown. All other components retain the functions described relative to FIG. 1. This embodiment is optically equivalent to FIG. 3 and is an equivalent structure.

Figure 5:
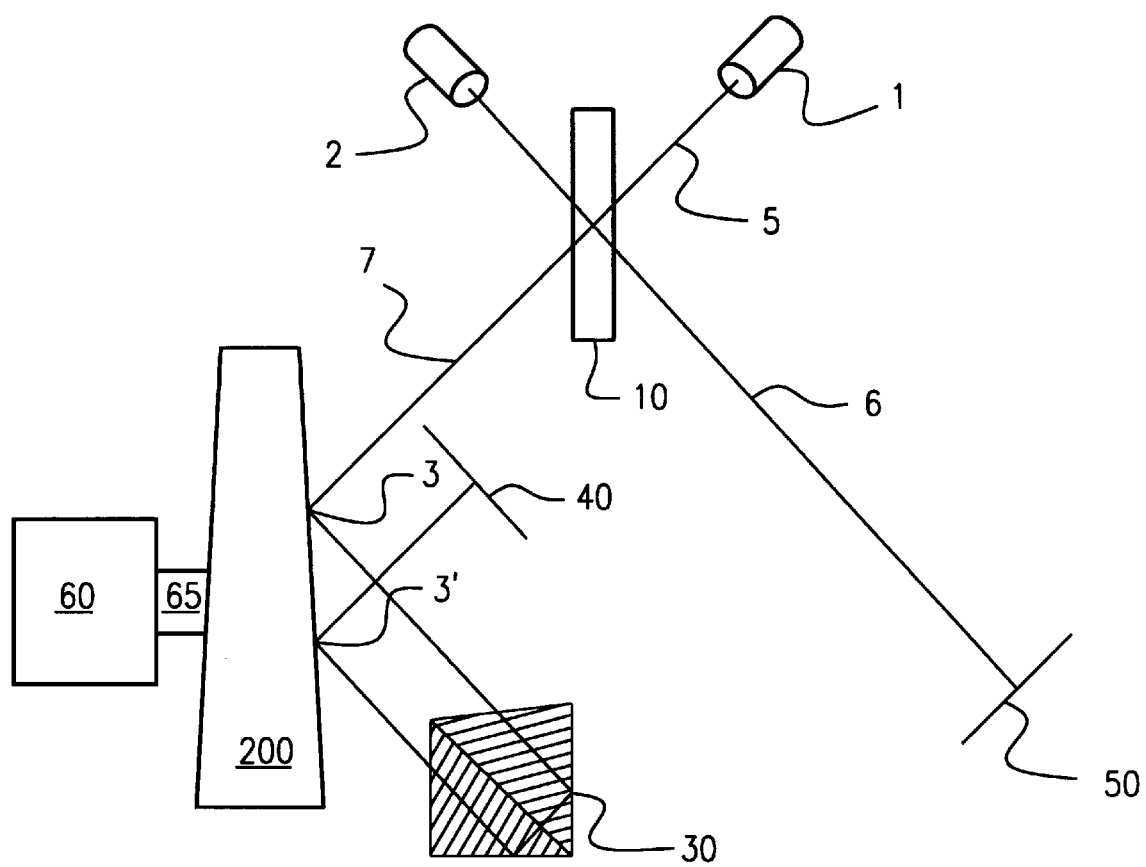
FIG. 5 is a diagram of one preferred embodiment of the present invention utilizing a nutating or precessing disk to produce variation of path difference.

FIG. 5 is another embodiment of the present invention. A cube-corner retroreflector 30 is used to invert the image of a single side of a disk-shaped moving mirror 200. This embodiment simplifies alignment since only return mirrors 40 and 50 require precise alignment. This embodiment is intrinsically insensitive to alignment of the moving mirror 200 and retroreflector 30.

It has been known to tilt- and shear-compensate a moving cube-corner retroreflector using reflection from a plane mirror. However, one advantage of the present invention is that moving mirror 200 has the shape of a disk and is not a cube-corner retroreflector but a flat, planar mirror. Hence, the moving mirror 200 can be made lighter and more resistant to deformation under the acceleration of motion. Further, fabrication and mounting of the moving mirror 200 is also simplified relative to known systems by requiring optical access to only one side of the moving mirror 200. The two sides of moving mirror 200 need not be parallel, and only one side requires an optical finish.

The path length in each arm of the embodiment shown in FIG. 5 must be relatively long to accommodate the beam folding. The cube-corner retroreflector 30 and the moving mirror 200 should preferably have apertures at least twice as large as the interferometer aperture. The resolution may be a function of beam motion on the optical surfaces, as well as of the tilt angle. Throughput may be a function of the amount of the divergence of the beam that can be accommodated without the beams being clipped at the edges of the return mirrors 40 and 50.

Referring again to FIG. 5, beamsplitter 10 divides the primary beam of energy 5 from a collimated source of radiant energy 1 to produce the energy beam 6 in a fixed arm of the interferometer and reflects off the flat return mirror 50 as shown. The reflected energy beam 7 from the beamsplitter 10 enters a variable arm and impinges on the precessing moving mirror 200. The reflected energy beam from the moving mirror 200 at 3 is returned by the cube-corner retroreflector 30 to the disk 200 at 3'. The beam returning from the cube-corner retroreflector 30 to the moving mirror 200 always makes a complementary reflection at the moving mirror 200 at 3' such that the beam arriving at the flat return mirror 40 always has normal incidence. Thus, the energy beam 7 can return on the reverse of its original path, to the beamsplitter 10 and to the detector 2. The detector signal may be recorded and/or processed according to known means. Various known optical devices may be interposed at any point in the propagation between the source 1 and the detector 2 to accomplish a variety of purposes that may be useful. These include modifying the beam to facilitate spectral imaging.

Rotating the moving mirror 200 can vary the path length of the second energy beam. The moving mirror 200 can be rotated about an axis of rotation by driving it with a motor 60 according to any of the many means that are known in the art. The moving mirror 200 is rigidly attached to the motor shaft 65 that defines the axis of rotation. The speed of rotation is controlled by varying the current or voltage applied to the motor windings according to known means. Rotation of the moving mirror 200 body produces precession or nutation of the surface of moving mirror 200.

The return mirror 50 forming the fixed arm can be replaced by identical components 30, 40, 60, 65, and 200 to those forming the variable arm. Operating the mirrors 200 in the two arms exactly 180 degrees out of phase may double the path difference of the interferometer. Selecting other phase angles between the two mirror motions can conveniently set the path difference to any value between zero and the maximum without any mechanical adjustment. Known means permit electrical adjustment of the relative phase of the motor 60 rotations. This feature allows convenient operation of the interferometer at a variety of resolutions, even though the tilt angle of the nutating mirrors 200 is fixed. This principle has been discussed above in connection with FIG. 13. That discussion is fully applicable here and requires no further explanation.

Figure 6:
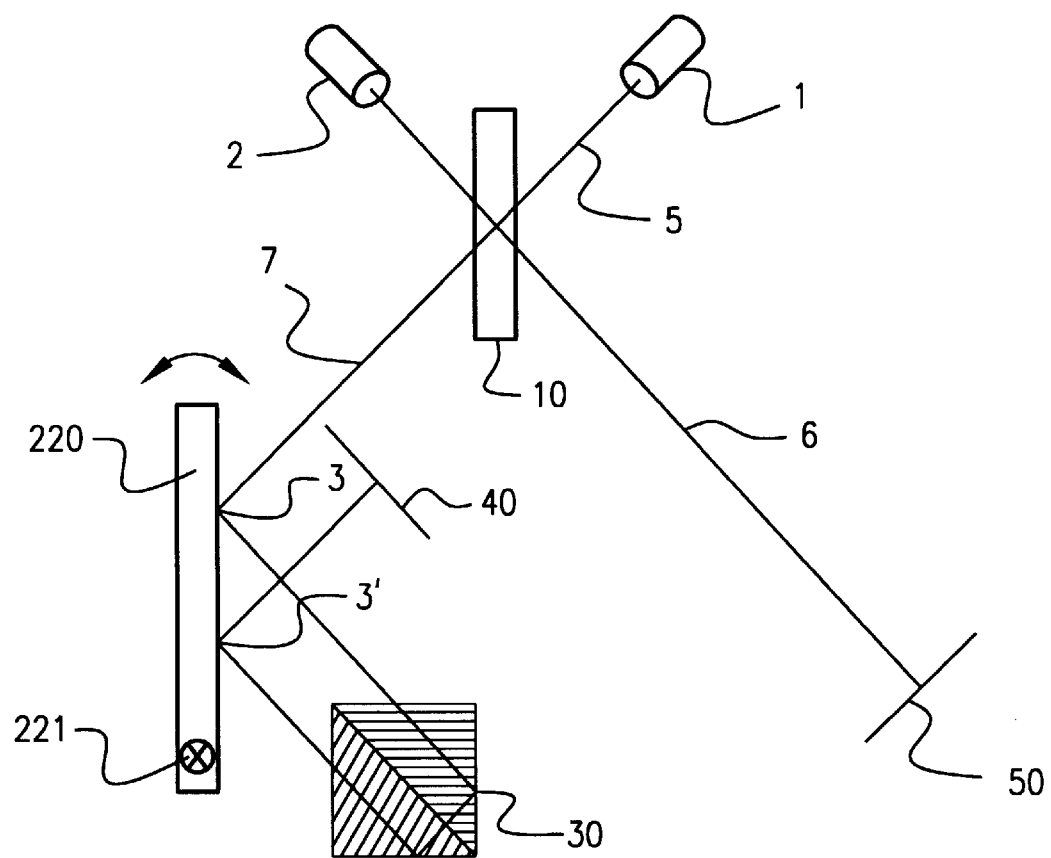
FIG. 6 is a diagram of a variation of the present invention that utilizes a tilting plane mirror to effect variation of path difference.
Figure 7:
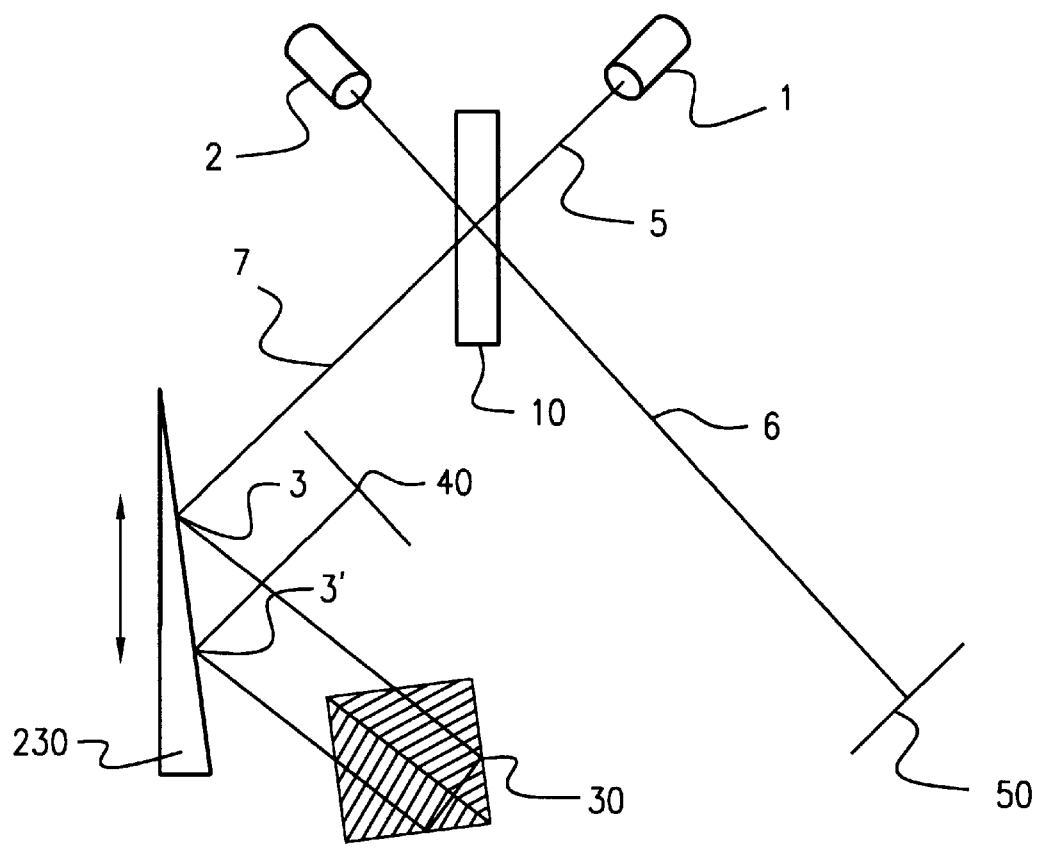
FIG. 7 is a diagram of a variation of the present invention that utilizes a sliding wedge mirror to effect variation of path difference.
Figure 8:
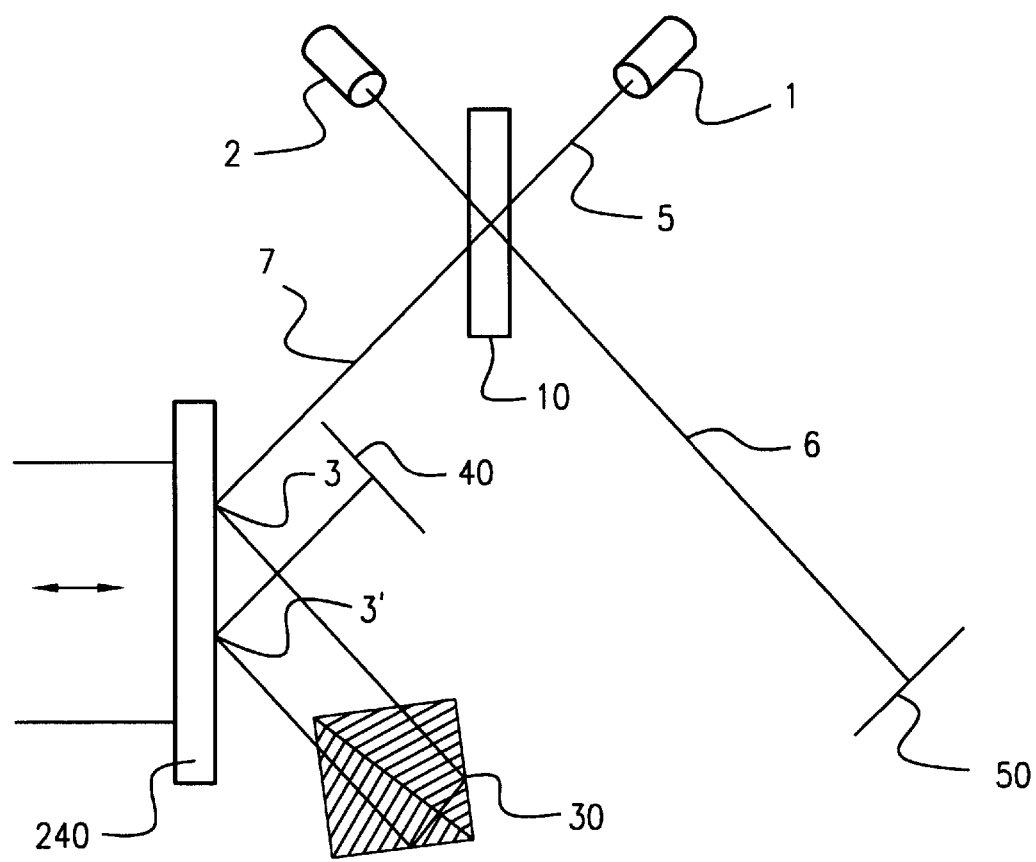
FIG. 8 is a diagram of a variation of the present invention that utilizes a translating plane mirror to effect variation of path difference.

FIGS. 6, 7 and 8 show several alternative embodiments of the present invention. These embodiments are tilt- and shear-compensated interferometers that use more conventional mirror scanning means than the precessing moving mirror 200 but which nevertheless maintain the compensation method of FIGS. 1, 2, 3, 4 and 5.

FIG. 6 replaces the disk-shaped moving mirror 200 in FIG. 5 with a pivoting moving mirror 220 that provides motion by pivoting about a pivot axis 221. The beamsplitter 10 divides the beam of energy 5 from the radiant energy source 1. The reflected energy beam 6 passes to the flat return mirror 50 that is aligned exactly perpendicular to the direction of propagation. This forms the fixed arm of a Michelson interferometer. The components in the fixed arm may be replaced by the same components used to vary path difference in the variable arm to allow for twice the difference in the total path length as discussed above in connection with FIG. 13. The energy beam 7 transmitted by the beamsplitter 10 passes to the plane mirror 220 and is reflected at 3 to the cube-corner retroreflector 30. Upon return from the retroreflector 30 the beam is offset sufficiently to clear the original incident beam on a pivoting mirror 220 such that after a second reflection from mirror 220 at 3' the beam may reach a flat return mirror 40 oriented perpendicular to the direction of propagation. The two energy beams 6,7 returning to the beamsplitter 10 from return mirrors 40 and 50, respectively, are recombined at the beamsplitter 10 and directed on toward the detector 2.

In FIG. 6, the pivoting mirror 220 may be pivoted about a pivot axis 221, to provide arcuate motion such that the optical path varies with the degree of tilt. By moving the axis 221 close to the points, 3 and 3', where the beams impinge on the mirror 220 the variation of optical path difference with rotation angle can be made small and thereby allow for less critical control. As before, an identical arrangement of the components 30, 40 and 220 can be placed in the second arm of the interferometer such that the total excursion of path difference is doubled. At the same time, the effects of external disturbances can be greatly reduced because they will affect both arms in the same way so as to cancel the disturbances. Balancing the mass about the pivot point 221 minimizes susceptibility to linear vibrations. If a completely separate second tilt mirror 220 is used in the second arm, equal torsional responses in the two arms may be used to cancel torsional disturbances. Another equivalent embodiment could utilize a mirror formed on the reverse side of mirror 220 to form the second arm of the interferometer, but this design would remain susceptible to some external disturbances.

FIG. 7 shows the use of a sliding wedged-shaped plane moving mirror 230 in place of the pivoting moving mirror 220 in FIG. 6. FIG. 7 has the advantage of multiplying the effect of mirror translation by the factor 4·sin (wedge angle) that can help to make precise or slow variation of path difference more convenient. The operation of FIG. 7 is as discussed for FIGS. 5 and 6 except that the wedged-shaped moving mirror 230 does not precess, nutate or tilt, but rather translates by sliding along a translation axis as indicated by a double-headed arrow. The mounting for the wedged-shaped moving mirror 230 allows for using a good linear bearing (such as an air bearing) and small wedge angles on moving mirror 230 to precisely or slowly vary path difference in a convenient way. Inadvertent variation of the angle of the surface of moving mirror 230, due to bearing imperfection, is optically compensated.

FIG. 8 shows another embodiment of the present invention. This embodiment uses a flat moving mirror 240 as the moving element. Plane mirrors are generally lighter and easier to make resistant to deformation than known cube-corner retroreflectors. The operation of FIG. 8 is the same as for FIG. 5 with the exception that the flat moving mirror 240 is translated along an axis roughly perpendicular to the surface of moving mirror 240. One particular advantage of this geometry allows the use of imperfect bearings or supports because any tilt or shear of the flat moving mirror 240 is compensated.

Referring again to FIG. 5, any distortion of the moving mirror 200 in the centrifugal field induced by rotation would be a concern. Several different mathematical approaches can be used to calculate the distortion of a spinning disk. These models indicate that even a beryllium disk of the necessary dimensions is marginally stiff. While the stiffness increases as the cube of the thickness, another important effect, radial stretching, is independent of thickness and its effects become worse as the thickness increases. Beryllium, aluminum and many other materials may be used for the disk material. Beryllium has approximately ⅔ the density of aluminum, and is about 4 times stiffer; together these attributes result in a 6x decrease of deflection for a given geometry. However, beryllium is rather expensive, both as a raw material and to machine. By using aluminum, the costs and the risks of exposure to beryllium may be avoided. Metals are desirable materials for fabricating spinning mirrors because they are strong and tough. However, at high rotation speeds any material will deform no matter what geometry is used. Under favorable conditions the deformation is small, predictable and symmetric. The present invention provides methods that compensate for the radial stretch of a disk-shaped mirror, neutralize the bending forces and balance the disk in spite of asymmetry about the axis of rotation.

At a rotation speed of 30,000 rpm, even a flat untilted 10-cm disk of aluminum is radially stretched by some 2700 nm. For a disk of 1.25-cm thickness, the resulting spherical curvature of the surfaces is approximately 1800 nm from center to edge. If the disk is simply flat and tilted on the shaft, it is known that the distortion can be far worse. With reference to FIG. 9B, by making the disk-shaped moving mirror 200 symmetric about the plane of rotation 204, a tilted surface 209 can be precessed or nutated while completely avoiding bending distortion. This approach can be described as a double-wedge design as shown in cross-section in FIG. 9B. It produces equal bending moments, from the two opposite faces 209 and 210 of the moving mirror 200, which cancel. There is no net bending distortion, but stretching is unavoidable. The distortion of the surface 209 caused by stretching is almost exactly spherical and can be compensated.

Figure 9A:
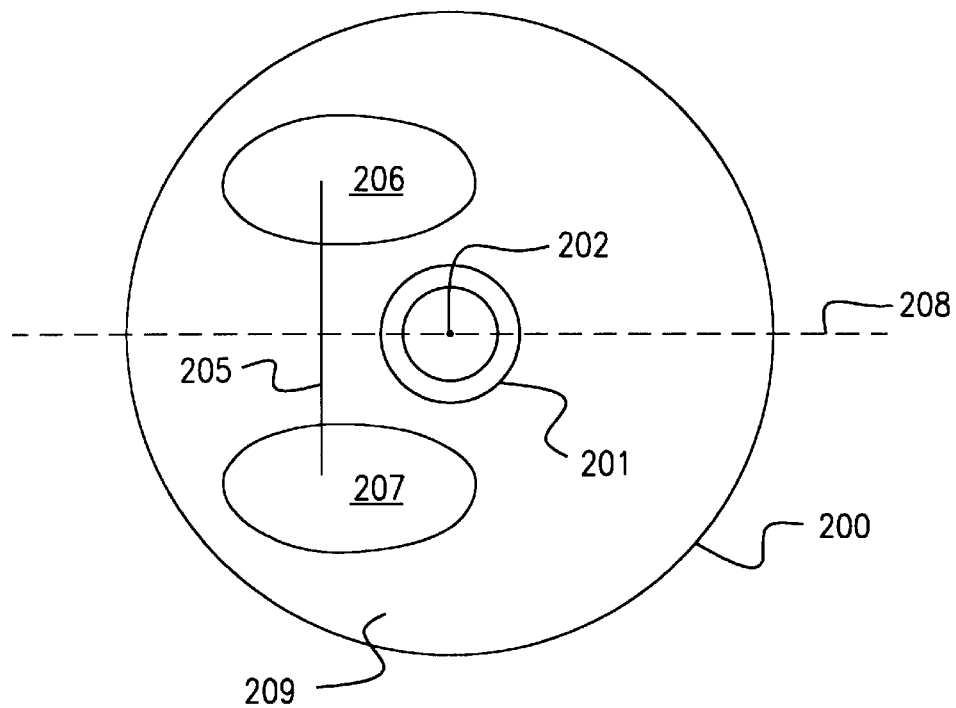
FIG. 9A is a diagram of a doubly wedged disk that does not suffer bending distortion during rotation.
Figure 9B:
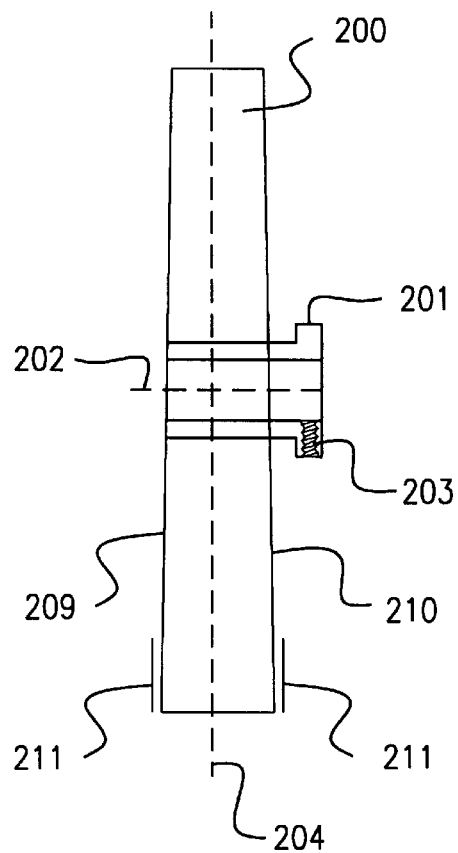
FIG. 9B is a diagram of a side cross-section view of the doubly wedged disk shown in FIG. 9A.

FIG. 9A illustrates one placement of beam footprints 206 and 207 on the moving mirror 200. It is important that the center of the beam footprints indicated by line 205 be displaced from the axis of rotation indicated by 202. If the beams are not displaced from 202, then rotation of the moving mirror 200 and consequent nutation or precession of its surface 209 will introduce no path variation. Indeed, the variation of path difference is proportional to the displacement between the center of rotation 202 and the beam centers indicated by 205. It is possible to adjust the path difference of the interferometer between zero and the maximum allowed by a given tilt angle 211, by sliding the moving mirror 200 relative to the beam footprints 206 and 207. Other beam footprint locations on the disk are possible, but the ones indicated in FIG. 9A are used in the preferred embodiment. It can also be discerned from FIG. 9A that there is a relationship between the disk diameter and the maximum beam diameter that can be accommodated. In general, the disk diameter must be somewhat larger than twice the beam diameter. The tilt angle 211 as well as the beam divergence and the hub 201 diameter govern the exact relationship of dimensions.

With reference to FIGS. 9A and 9B, the disk-shaped body of the moving mirror 200 has an optical surface 209 and back surface 210 both of which are equally tilted, by angle 211, relative to the plane of rotation 204. The optical surface 209 of the moving mirror 200 is tilted at an angle 211 from the plane 204 perpendicular to the axis of rotation 202 as shown in FIG. 9B. The back surface 210 of the moving mirror 200 is tilted by an angle 211 from the plane perpendicular to the axis of rotation 202 in the direction opposite to the tilt of optical surface 209. The axis of rotation 202 is perpendicular to the plane of rotation 204 that passes through the disk vertically in FIG. 9B. Thus the disk has a doubly wedged cross section when viewed from the angle of FIG. 9B. The bending moments caused by the extra material on both faces 209 and 210 are symmetric about the plane of rotation 204 and cancel thereby removing any bending moment from the disk. The hub 201 can be clamped to a shaft by a setscrew indicated by 203 to mount the disk. If the clamping force is small relative to the modulus of the material, distortion of the optical surface or surfaces will be small enough to allow efficient interferometric or optical use. The hub 201 may be glued or epoxied into the moving mirror 200 to avoid disturbing the optical surfaces.

Figure 10A:
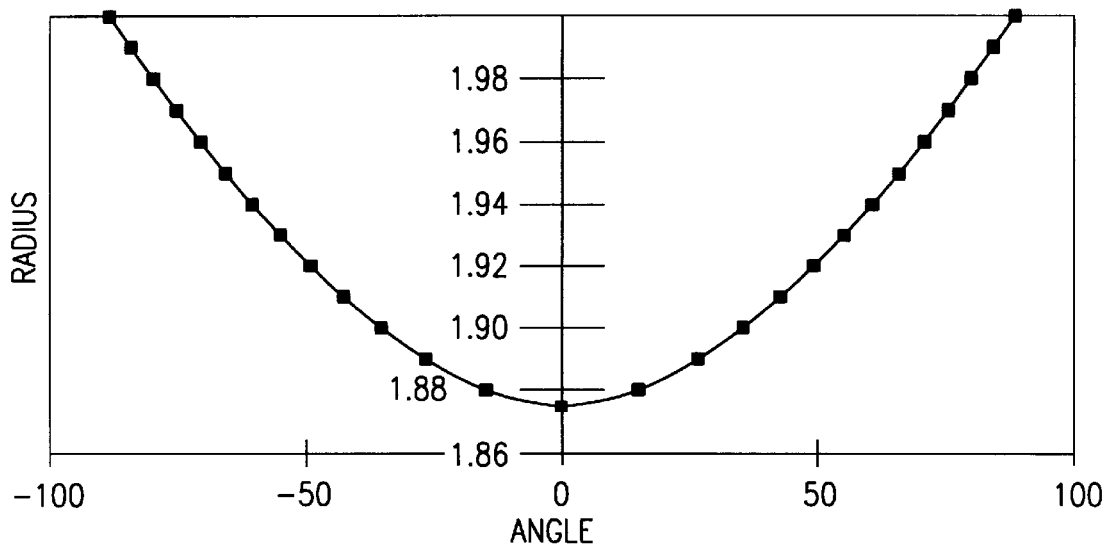
FIG. 10A is a diagram of the varying radius required to bring a wedged disk into balance.

The balance equation for the radius of a doubly wedged disk as a function of angle was derived by integrating the equation shown in FIG. 10A, and fitted to produce the plot in FIG. 10A. The symbols in equation in FIG. 10A are rho for density, f for frequency, r for radius, theta for angle position on the disk, and phi for the tilt angle of the disk faces. Although the solution has cubic and quartic terms, it fits almost exactly to a circle minus a cosine term, as indicated by the plot in FIG. 10A which has two superimposed sets of points and lines (the exact result and the fit to a circle minus cosine term). The range of angles corresponds to the thick half of the disk, while the thin half was constrained to a constant radius of 5 cm. This result is intuitively reasonable, because the thickness of the disk around any constant radius varies sinusoidally. The force exerted by a differential of mass anywhere in the disk goes as its radius. The higher order terms in the balance equation arise because the mass in a differential of radius also varies radially. If the disk were of constant radius (as well as being doubly wedged), the extra material on the thick side would unbalance it. To balance the disk, the radius on the thick side can be made to vary as the function of angle plotted in FIG. 10A. To achieve balance, material must be removed from the thick side of the disk. To maintain the cancellation of bending moments and the mechanical integrity of the moving mirror 200, the material may be removed by shortening the radius. On both sides of the thinnest point, which is taken to be 0 degrees, the radius can be constant for 90 degrees. On the opposite half of the moving mirror 200, the radius can vary as a function of angle to compensate for the greater thickness. For the example cited above, radius=5.08 cm+0.3 cm×cosine (theta), where theta is the angle from 90 to 270. Alternatives include maintaining a constant radius, but drilling the edge of a disk-shaped mirror to remove mass from the thick side.

Figure 10B:
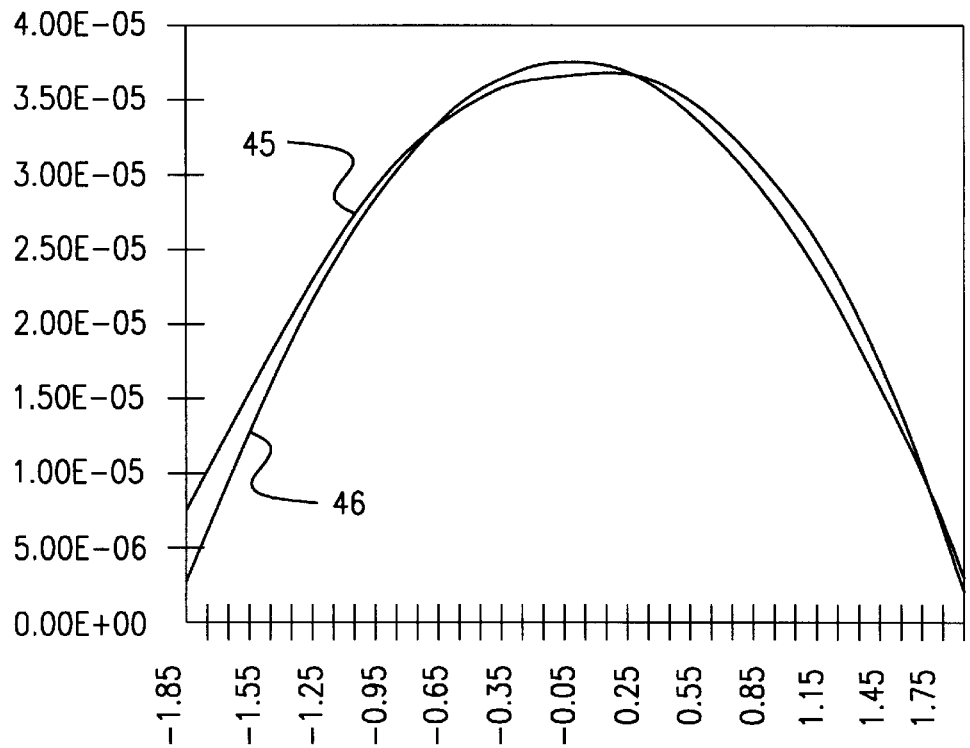
FIG. 10B is a diagram of the distortion, of the surface of a doubly wedged disk, caused by rotation.
Figure 11A:
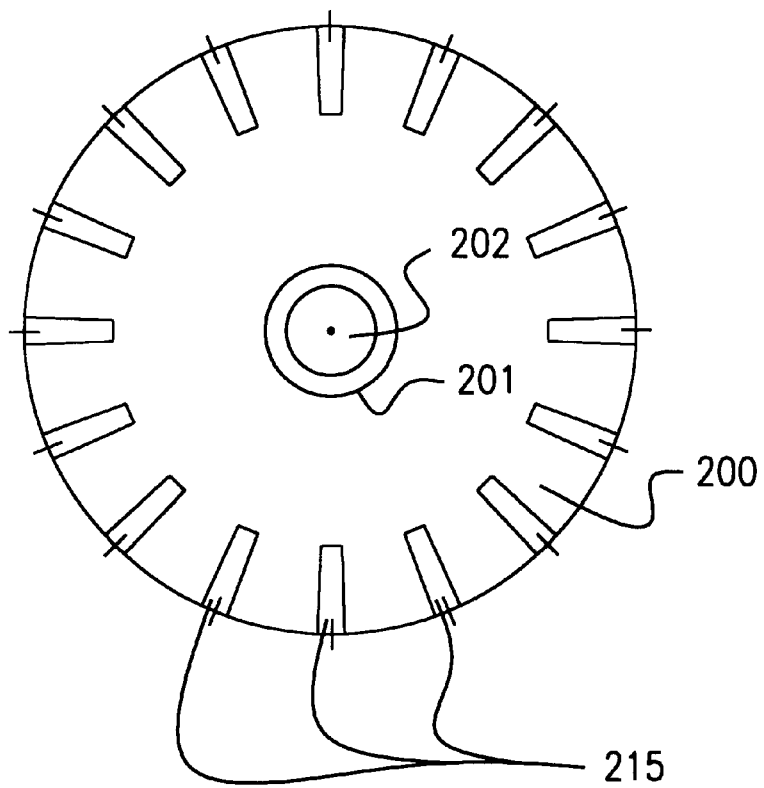
FIG. 11 is a diagram of the preferred method of compensating for stretching by drilling the disk periphery.
Figure 11B:
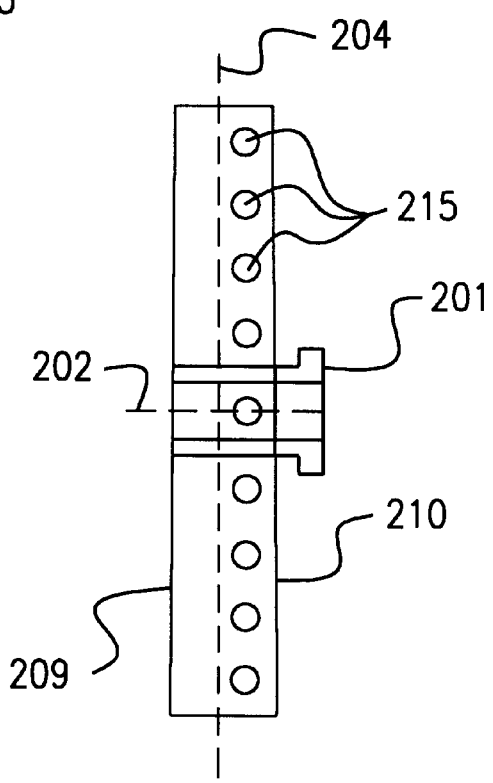
Figure 12:
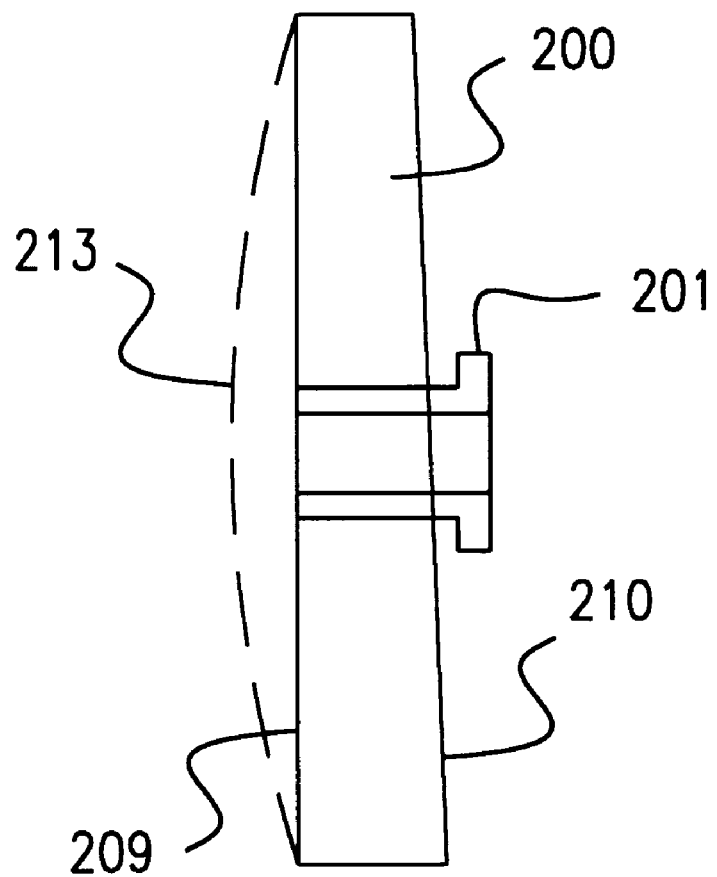
FIG. 12 is a diagram of an alternative method of compensating for stretching by convex spherical polishing.

The moving mirror 200 may be fabricated from aluminum for optimum economy of manufacture or from beryllium that may be more appropriate for extreme operating speeds or conditions. An example case of a 10-cm diameter aluminum disk of approximately 1.25-cm thickness spinning at 30,000 rpm will be used as an example. It was modeled by finite element methods to estimate distortion caused by stretching at operating speed. Aluminum has a relatively low modulus and the disk stretches radially because of centrifugal force. The radial stretch will cause a thinning which is largest near the center of the moving mirror 200 where the axis of rotation 202. The tensile stress in this example disk, near the center, is approximately 35 MPa which is well within the elastic limit of many commercial aluminum alloys. The stress tapers off radially from the center. The results of finite element modeling are plotted as curve 45 in FIG. 10B. A spherical fit to the modeling data are also plotted as curve 46 in FIG. 10B. The fit is well within a 1/10-wave requirement at the shortest wavelength of the mid-infrared spectrum, 2.5 µm. The preferred approach to compensating the spherical distortion is indicated by FIG. 11. The moving mirror 200 is drilled around the periphery with a pattern of holes 215 that, in a centrifugal field, produce a bending moment that compensates the optical surface 209 of the disk for radial stretch. The holes 215 are drilled evenly around the circumference, taking into account the variation of radius. The holes 215 are placed behind the plane of rotation 204 such that the back face 210 of the moving mirror 200 is curved approximately twice as far concave as it would otherwise be. The spacing of the holes 215, their outer diameters, taper of diameter and depths can be varied to account for different disk materials and dimensions. The advantage of this approach, relative to the one disclosed in FIG. 12, is that the compensation provided by the drilled periphery holes 215 varies as the square of the rotation speed. Since the spherical distortion also varies as the square of the rotation speed, the distortion will be compensated for all rotation speeds. The outer length of the holes 215 may be plugged to reduce noise caused by turbulence when the disk is operated in air. The disk may also be operated in vacuum to reduce acoustic noise, friction due to air turbulence, and optical noise caused by the refractive index variation associated with turbulence.

A second method to counter the effects of thinning is diagrammed in FIG. 12. The disk surface 209 may be precompensated for the concave spherical distortion caused by stretching with a convex spherical polish indicated by 213. To a very good approximation, the distortion caused by radial stretching is spherical, so that after spherical polishing to the figure 213, the disk surface 209 will become flat at one desired operating speed. For the example case, the desired radius of convex curvature is approximately 63,500 cm. Thus, the surface should have a spherical polish spanning approximately 1800 nm of chord. The exact numbers will vary with material properties, disk dimensions and operating speed. The optimum values may be determined by known means, particularly including finite element modeling.

The principles, embodiments and modes of operation of the present invention have been set forth in the foregoing provisional specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

I claim:

1. A spectrometer, comprising:

a source of a primary beam of radiant energy;

a beamsplitter, fixed in position relative to the primary beam of radiant energy, for dividing the primary beam of radiant energy into at least first and second energy beams;

a first return mirror, fixed in position relative to the primary beam of radiant energy, for reflecting the first energy beam back to the beamsplitter;

a single moving mirror that receives the second energy beam from the beamsplitter, the moving mirror having a planar optical surface mounted so as to reflect the second energy beam, the single moving mirror also being mounted to move the planar optical surface relative to the primary beam of radiant energy;

a retroreflector, fixed in position relative to the primary beam of radiant energy, positioned to receive the second energy beam after it is reflected by the optical surface of the moving mirror;

a second return mirror, fixed in position relative to the primary beam of radiant energy, for returning the second beam of energy to the beamsplitter by way of the retroreflector and the moving mirror, the second return mirror and the retroreflector being aligned to produce a reflection that is complementary at least in part of the second energy beam and to return the second energy beam to the beamsplitter along a path that is antiparallel to at least a part of the path taken by the second energy beam when coming from the beamsplitter;

the beamsplitter combining at least a part of each of the first and second energy beams to form a combined beam, the beamsplitter facilitating transmission of the combined beam to a detector of the spectrometer.

2. A spectrometer as claimed in claim 1, wherein the retroreflector is a cube-corner reflector.

3. A spectrometer as claimed in claim 1, wherein the retroreflector is a lateral-transfer retroreflector.

4. A spectrometer as claimed in claim 1, wherein the retroreflector is a roof reflector.

5. A spectrometer as claimed in claim 1, wherein the retroreflector inverts the energy beam from the moving mirror.

6. A spectrometer as claimed in claim 1, wherein the mounting of the moving mirror rotates it about an axis of rotation.

7. A spectrometer as claimed in claim 6, wherein the moving mirror has a disk shape and the optical surface is one side of the disk.

8. A spectrometer as claimed in claim 7, wherein the disk-shape of the moving mirror has a thickness that varies sinusoidally with angle about the axis of rotation.

9. A spectrometer as claimed in claim 7, wherein the side of the disk opposite the optical surface is contoured to compensate for deformation of the disk caused by rotation of the disk about the axis of rotation.

10. A spectrometer as claimed in claim 7, wherein the disk is balanced for rotation about the axis of rotation.

11. A spectrometer as claimed in claim 7, wherein the disk is compensated for stretching distortion to provide a flat surface when rotated about the axis of rotation.

12. A spectrometer as claimed in claim 1, wherein the mounting of the moving mirror pivots it about a pivot axis.

13. A spectrometer as claimed in claim 1, wherein the mounting on the moving mirror translates it along a translation axis.

14. A spectrometer as claimed in claim 1, further comprising:

a single secondary moving mirror that receives the first energy beam from the beamsplitter before the first energy beam reaches the first return mirror, the secondary moving mirror having a planar secondary optical surface mounted so as to reflect the first energy beam, the single secondary moving mirror also being mounted to move its planar optical surface relative to the primary beam of radiant energy;

a secondary retroreflector, fixed in position relative to the primary beam of radiant energy, positioned to receive the first energy beam after it is reflected by the optical surface of the secondary moving mirror;

the first return mirror and the secondary retroreflector being aligned to produce a reflection that is complementary at least in part of the first energy beam and to return the first energy beam to the beamsplitter along a path that is antiparallel to at least a part of the path taken by the first energy beam when coming from the beamsplitter.

* * * * *